(12) United States Patent
Kim et al.

(10) Patent No.: US 11,170,277 B2
(45) Date of Patent: Nov. 9, 2021

(54) DISPLAY APPARATUS AND CONTROL METHOD THEREOF

(71) Applicant: Samsung Electronics Co., Ltd., Suwon-si (KR)

(72) Inventors: Doyoung Kim, Suwon-si (KR); Wootaek Wi, Suwon-si (KR); Younggon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/509,013

(22) Filed: Jul. 11, 2019

(65) Prior Publication Data
US 2020/0019826 A1 Jan. 16, 2020

(30) Foreign Application Priority Data

Jul. 11, 2018 (KR) .................. 10-2018-0080582

(51) Int. Cl.
| | |
|---|---|
| *H04N 5/50* | (2006.01) |
| *G06K 19/06* | (2006.01) |
| *H04N 21/422* | (2011.01) |

(52) U.S. Cl.
CPC ... *G06K 19/06028* (2013.01); *G06K 19/0614* (2013.01); *G06K 19/06037* (2013.01); *H04N 21/42209* (2013.01)

(58) Field of Classification Search
CPC ....... H04N 2005/441; H04N 21/42209; H04N 5/50; G06K 19/06; G06K 19/06028;
(Continued)

(56) References Cited

U.S. PATENT DOCUMENTS 8,312,501 B2 * 11/2012 Yoshikawa ............ H04H 20/57
709/206
9,652,758 B2 * 5/2017 Zhou ...................... H04W 4/24
(Continued)

FOREIGN PATENT DOCUMENTS

| KR | 10-2012-0042266 | 5/2012 |
|---|---|---|
| KR | 10-2012-0090388 | 8/2012 |

(Continued)

OTHER PUBLICATIONS

International Search Report dated Nov. 14, 2019 in corresponding International Patent Application No. PCT/KR2019/008578.
(Continued)

*Primary Examiner* — Trang U Tran
(74) *Attorney, Agent, or Firm* — Staas & Halsey, LLP

(57) ABSTRACT

Disclosed is a display apparatus that displays an information image and a control method thereof. The display apparatus includes an image processor; a display; and a processor configured to make content be processed by the image processor, make a content image based on the processed content be displayed on the display, generate information about an operation state of the display apparatus, and make an information image containing the generated information about an operation state and recognizable by a user terminal be displayed on the display. With this, the state information of the display apparatus may be effectively transmitted to the server that manages the display apparatus.

18 Claims, 17 Drawing Sheets
(1 of 17 Drawing Sheet(s) Filed in Color)

(58) Field of Classification Search
CPC .......... G06K 19/0614; G06K 19/06037; G06F 11/22; G06F 15/16
USPC .......................... 345/634; 348/569, 725, 739
See application file for complete search history.

(56) References Cited

U.S. PATENT DOCUMENTS

2013/0117153 A1* 5/2013 Shen .................. G06Q 30/0241
            705/26.9
2017/0124603 A1* 5/2017 Olson ..................... H04W 4/02

FOREIGN PATENT DOCUMENTS

| KR | 10-2012-0114049 | 10/2012 | | |
| KR | 10-2013-0064953 | 6/2013 | | |
| KR | 10-2013-0065876 | 6/2013 | | |
| KR | 2013-0064953 A | * 6/2013 | .............. | G06F 11/22 |
| KR | 10-1838283 | 3/2018 | | |
| KR | 10-2018-0039368 | 4/2018 | | |

OTHER PUBLICATIONS

Written Opinion of the International Searching Authority dated Nov. 14, 2019 in corresponding International Patent Application No. PCT/KR2019/008578.

* cited by examiner

105

# DISPLAY APPARATUS AND CONTROL METHOD THEREOF

CROSS-REFERENCE TO RELATED THE APPLICATION

This application is based on and claims priority under 35 U.S.C. § 119 to Korean Patent Application No. 10-2018-0080582 filed on Jul. 11, 2018 in the Korean Intellectual Property Office, the disclosure of which is incorporated by reference herein in its entirety.

BACKGROUND

Field

Apparatuses and methods consistent with the exemplary embodiments relate to a display apparatus and a control method thereof, and more particularly to a display apparatus that displays an information image and a control method thereof.

Description of the Related Art

A display apparatus, in particular, a digital signage, which is installed in a public place, a commercial space, or the like and provides digitalized media, needs to be subjected to ongoing maintenance.

When the display apparatus is capable of performing direct communication with a server that is in charge of the maintenance of the display apparatus, the maintenance of the display apparatus is carried out by exchanging information about the operation state of the display apparatus with the server.

However, due to costs of building a communication system, the digital signage or the like display apparatus may operate without a communication function. In this case, maintenance is difficult because a person in charge of management has to directly visit the display apparatus to check the state of the display apparatus.

Although the display apparatus has a communication system and is thus capable of exchanging information with the server through communication, failure or the like problem in communication with the server makes it difficult to carry out the maintenance of the display apparatus like a display apparatus having no communication systems.

SUMMARY

An aspect of one or more exemplary embodiments is to provide a display apparatus capable of generating its own state information and a control method thereof.

Another aspect of one or more exemplary embodiments is to provide a display apparatus capable of effectively sending its own state information to a server for managing the same and a control method thereof.

According to an aspect of an exemplary embodiment, a display apparatus includes an image processor; a display; and a processor configured to make content be processed by the image processor, make a content image based on the processed content be displayed on the display, generate information about an operation state of the display apparatus, and make an information image containing the generated information about an operation state and recognizable by a user terminal be displayed on the display.

The processor may generate the operation state information based on the display apparatus being in a preset operation state.

The processor may display the information image in addition to the content image.

The processor may stop displaying the content image and displays the information image.

The processor may output notification information of notifying a user that the information image is displayed.

The processor may output notification information different in kind according to the operation states.

The display apparatus may further include a communicator configured to communicate with a server, and the processor may generate the operation state information, based on failure in communication of the communicator with the server.

The information image may include marketing information provided to a user of the user terminal.

The processor may transmit the information image to the user terminal, based on proximity detection of a user who approaches the display apparatus.

According to another aspect of an exemplary embodiment, a method of controlling a display apparatus include processing content; displaying a content image based on the processed content; generating information about an operation state of the display apparatus; and displaying an information image containing the generated information about an operation state and recognizable by a user terminal.

The generating of the operation state information may include generating the operation state information based on the display apparatus being in a preset operation state.

The displaying of the information image may include displaying the information image in addition to the content image.

The displaying of the information image may include stopping displaying the content image and displaying the information image.

The method may further include outputting notification information of notifying a user that the information image is displayed.

The display apparatus may further include a communicator configured to communicate with a server, and the generating of the operation state information may include generating the operation state information, based on failure in communication of the communicator with the server.

The information image may include marketing information provided to a user of the user terminal.

According to still another aspect of an exemplary embodiment, a user terminal includes an image capturer; a communicator; and a processor configured to capture an information image displayed on a display apparatus, transmit the captured information image to a server, and perform operation based on a result of processing marketing information received from the server.

According to still another aspect of an exemplary embodiment, a server include a communicator; a storage; and a processor configured to receive an information image from a user terminal, separate operation state information and marketing information from the received information image, store the operation state information in the storage, process the marketing information, and transmit a process result to the user terminal.

According to still another aspect of an exemplary embodiment, a computer program is combined to a display apparatus and stored in a medium to carry out the method, as described above.

The computer program may be stored in a medium in a server and downloadable in the display apparatus through a network.

According to still another aspect of an exemplary embodiment, a computer program product is combined to a display apparatus to carry out the method, as described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
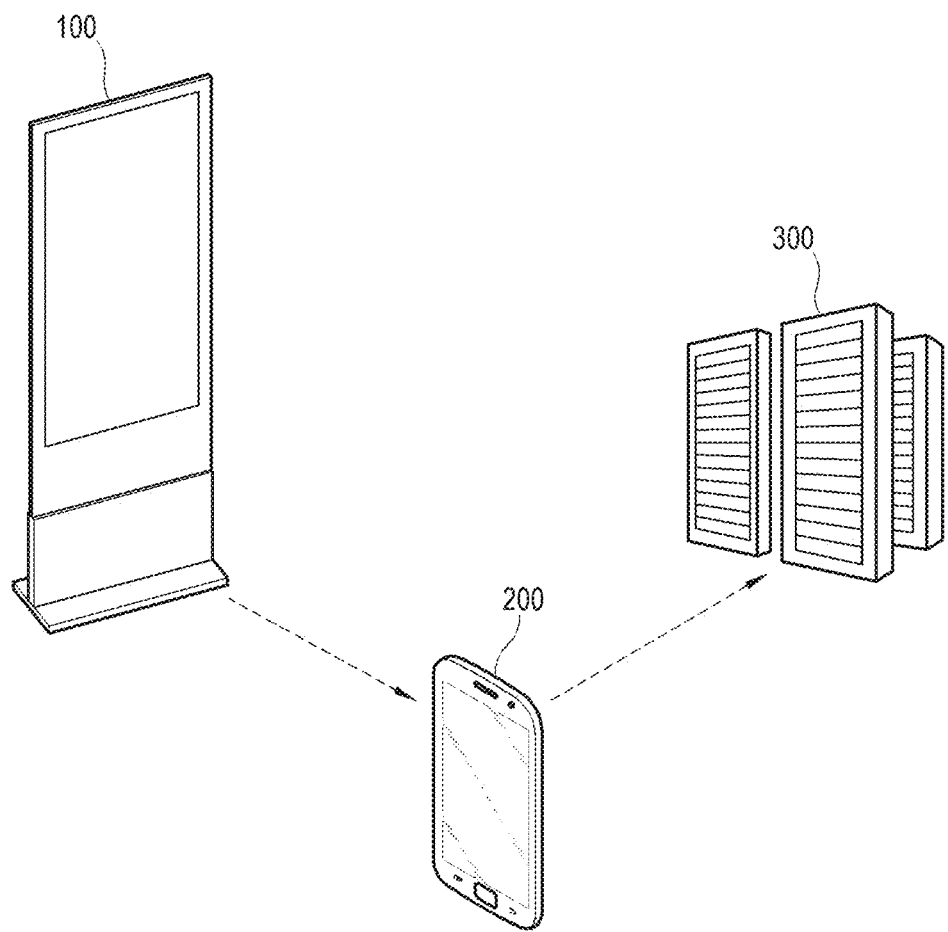
FIG. 1 is a schematic view of a system including a display apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be modularized into at least one processor. Further, in the following exemplary embodiments, at least one among a plurality of elements refer to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 is a schematic view of a system including a display apparatus according to an embodiment of the disclosure. The system including the display apparatus according to an embodiment of the disclosure may include a display apparatus 100, a user terminal 200, and a server 300.

The display apparatus 100 according to an embodiment of the disclosure may for example be actualized by a digital signage. Further, the display apparatus 100 according to an embodiment of the disclosure may for example be actualized by a television (TV), an electronic frame, a digital billboard, or a large format display (LFD). However, the display apparatus 100 according to one embodiment of the disclosure is not limited to these examples but may include any apparatus capable of displaying an image or content. In particular, the display apparatus 100 may include a display apparatus that can carry out direct communication with the server 300 as it is installed in a public place, a commercial space, etc.

The user terminal 200 according to an embodiment of the disclosure may for example include a smartphone, a tablet computer, a mobile phone, a personal digital assistant (PDA), a smartwatch, etc. However, the user terminal 200 according to one embodiment of the disclosure is not limited to these examples but may include any apparatus capable of communicating with the server 300. In particular, the user terminal 200 may include an apparatus that is portable and capable of capturing or receiving an information image displayed on the display apparatus 100.

The server 300 according to an embodiment of the disclosure may be actualized without any specific limitations as long as it can collect and process information about the operation state of the display apparatus 100.

Figure 2:
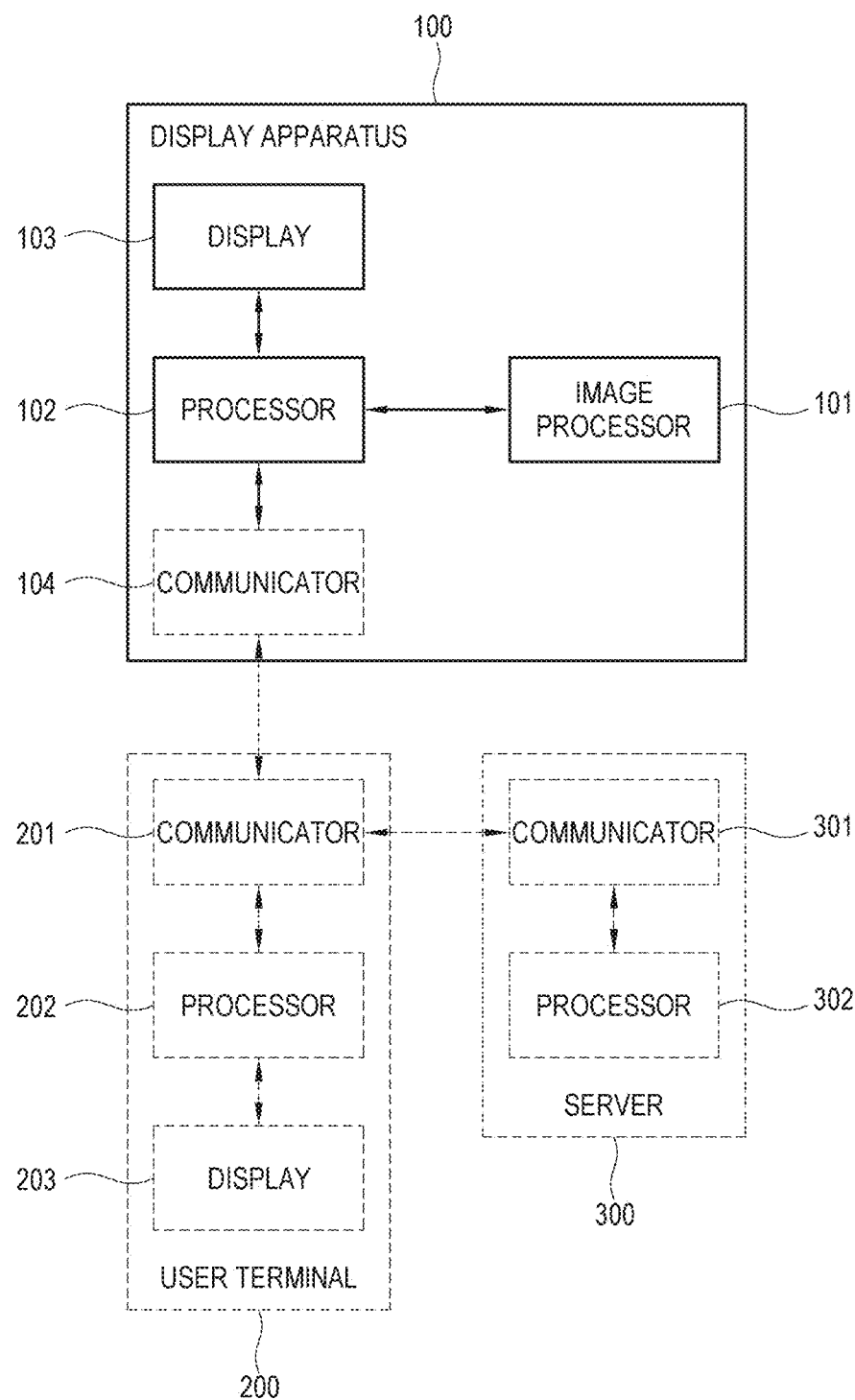
FIG. 2 is a block diagram of a system including a display apparatus according to an embodiment of the disclosure.

FIG. 2 is a block diagram of a system including a display apparatus according to an embodiment of the disclosure.

The display apparatus 100 according to one embodiment of the disclosure includes an image processor 101, a processor 102, and a display 103. However, the configuration of the display apparatus 100 shown in FIG. 2 is merely an example, and the display apparatus according to one embodiment of the disclosure may be actualized by alternative elements. In other words, the display apparatus according to one embodiment of the disclosure may include other elements in addition to the configuration shown in FIG. 2 or exclude some elements from the configuration shown in FIG. 2. According to an embodiment of the disclosure, each element may be actualized by at least one hardware and/or software, or may be actualized by a circuit or a chip.

The image processor 101 may process an image signal including image content. There are no limits to the kinds of image processing processes performed by the image processor 101. For example, the image processing performed by the image processor 101 may include demultiplexing for dividing an input stream into sub streams of video, audio and appended data; decoding corresponding to an image format of an image stream; deinterlacing for converting an interlaced type of an image stream into a progressive type; scaling for adjusting an image stream to have a preset resolution; noise reduction for improving image quality; detail enhancement; frame refresh rate conversion; etc.

The processor 102 may generate the operation state information of the display apparatus. In this regard, detailed descriptions will be made later.

The processor 102 may perform control for operating general elements of the display apparatus 100. The processor 102 may include a control program (or instruction) for performing such control operations, a nonvolatile memory in which the control program is installed, a volatile memory in which at least a part of the installed control program is loaded, and at least one processor or central processing unit (CPU) for executing the loaded control program. Further, the control program may be stored in an electronic apparatus other than the display apparatus 100.

The control program may include a program(s) achieved in the form of at least one of a basic input/output system (BIOS), a device driver, an operating system, firmware, a platform, and an application program. According to one embodiment, the application program may be previously installed or stored in the display apparatus 100 when the display apparatus 100 is manufactured, or may be installed in the display apparatus 100 on the basis of application program data received from the outside when used in the future. The application data may be for example downloaded from an application market and the like external server to the display apparatus 100, but not limited thereto. Meanwhile, the processor 102 may be actualized in the form of a device, an S/W module, a circuit, a chip, or combination thereof.

The processor 102 may for example control the image processor 101 to process content, and control the display 103 to display an image based on the processed content. In the display apparatus 100 shown in FIG. 2, both the process and control are performed in one processor 102. However, this is merely an example, and a display apparatus according to an alternative embodiment of the disclosure may include a separate controller in addition to the processor.

The display 103 may display an image. The display 103 may be for example actualized by various display types such as liquid crystal, plasma, a light emitting diode (LED), an organic light emitting diode (OLED), a surface-conduction electron emitter, a carbon nano tube, nano crystal, etc. When the type of the display 103 is the liquid crystal, the display 103 includes a liquid crystal display (LCD) panel, a backlight unit for emitting light to the LCD panel, a panel driver for driving the LCD panel, etc. The display 103 may be actualized by a self-emissive OLED panel without the backlight unit.

The display apparatus 100 according to an embodiment of the disclosure may further include the communicator 104. In particular, the communicator 104 may be used to communicate with a relatively near terminal 200. To this end, the communicator 104 may be configured to perform one or more communications among Wi-Fi, WiFi Direct, Ethernet, Bluetooth, Bluetooth Low Energy (BLE), Serial Port Profile (SPP), Zigbee, infrared communication, radio control, ultra-wide band (UWB), wireless universal serial bus (USB), and near field communication (NFC). The communicator may be actualized in the form of a device, an S/W module, a circuit, a chip, etc.

The system with the display apparatus 100 according to an embodiment of the disclosure may further include the user terminal 200 and the server 300. The user terminal 200 may include a communicator 201, a processor 202, and a display 203. Further, the user terminal 200 may further include a camera or an image capturer for capturing an image. The server 300 may further include a communicator 301 and a processor 302. Although these elements may be different in detailed operation, fundamental configurations thereof are equivalent to those of the corresponding elements in the foregoing display apparatus 100. Therefore, detailed descriptions thereof will be omitted.

Figure 3:
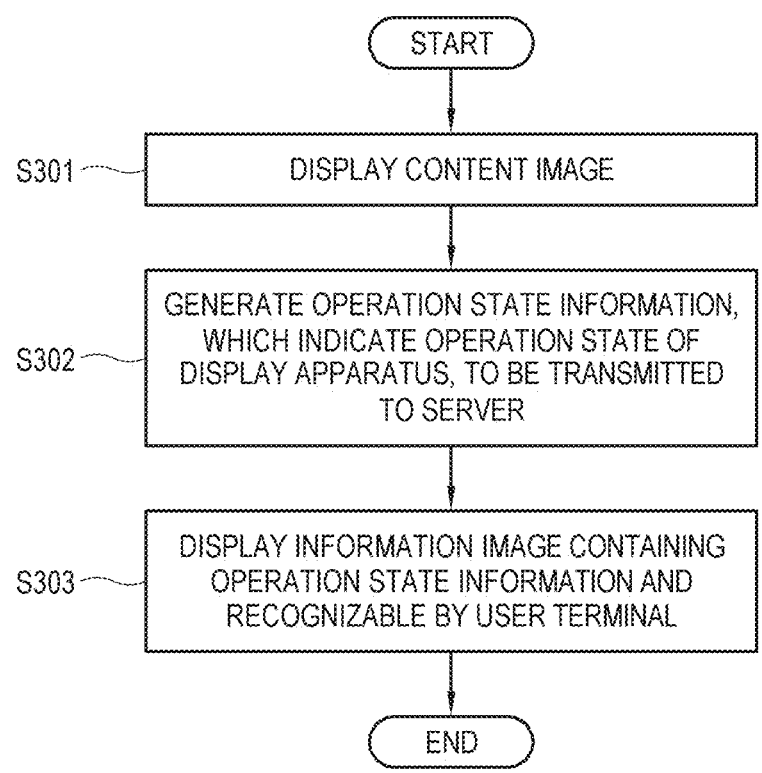
FIG. 3 is a flowchart showing operation of a display apparatus according to an embodiment of the disclosure.

FIG. 3 is a flowchart showing operation of a display apparatus according to an embodiment of the disclosure.

The processor 102 of the display apparatus 100 according to an embodiment of the disclosure processes content containing an image to be processed by the image processor 101, and makes the image of the processed content to be displayed on the display 103 (S301). Here, the content includes any content that can be displayed on the display 103 of the display apparatus 100, and there are no specific limits to the substance and format of the content.

The processor 102 generates the operation state information (S302). The operation state information may include any information related to the operation states of the display apparatus 100. For example, when the display apparatus 100 internally and externally includes a printed circuit board (PCB), a set cover, front glass, a main integrated circuit (IC), etc., the operation state information of the disclosure may include at least one piece of information about a PCB voltage level, the presence of a set cover, the presence of the front glass, a shock in the front glass, the interior humidity and temperature of the front glass/set, a front illumination level, a main IC temperature, and presence of operation, etc. Besides, the operation state information may include information about operation states of other elements of the display apparatus 100, such as the image processor 101, the processor 102, the display 103 or the communicator 104.

The generated operation state information may be stored in the display apparatus 100, displayed on the display 103 in response to a specific call, or transmitted to the server 300 or other external devices. For transmission to the server 300 or the external devices, the operation state information may be generated with a format by which transmission to the server 300 or the external devices is enabled or facilitated.

Figure 4:
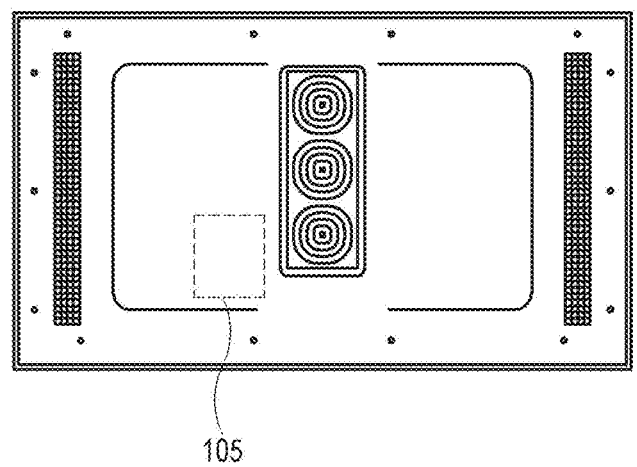
FIG. 4 is a view illustrating an example of a sensing unit in a display apparatus according to an embodiment of the disclosure.

The processor 102 may generate the operation state information based on information sensed by a sensor. To this end, the display apparatus 100 may further include a sensing unit 105. FIG. 4 illustrates an example of the sensing unit 105 in the display apparatus according to an embodiment of the disclosure, in which the sensing unit 105 of the display apparatus 100 according to an embodiment of the disclosure may for example include an illumination sensor, a temperature sensor, a humidity sensor, and a thermo-hygrometer. There are no limits to the position of the sensing unit 105. For example, the sensing unit 105 may be positioned in the front of the display apparatus 100 or in the back of the display apparatus 100 as shown in FIG. 4. Alternatively, the sensing unit 105 may be mounted to the inside of the display apparatus 100. In addition, sensors of the sensing unit 105 may be disposed at different positions. With the sensing unit 105, the processor 102 may for example detect the shock in the display apparatus, the installation environments of the display apparatus, a voltage level in a circuit, the temperature of the display apparatus, etc., and generate the operation state information based on the detection.

Thus, the display apparatus may generate the information about the operation state of the display apparatus in itself.

Referring back to FIG. 3, the processor 102 of the display apparatus 100 according to an embodiment of the disclosure makes the display 103 display thereon an information image containing the generated operation state information and recognizable by the user terminal 200 (S303).

Figure 5:
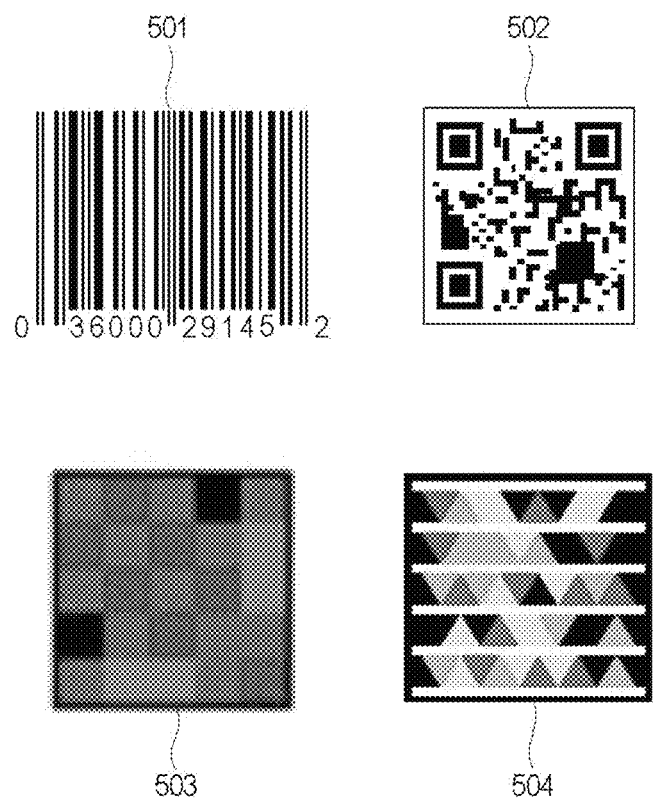
FIG. 5 is a view illustrating an example of an information image displayed on a display apparatus according to an embodiment of the disclosure.

Here, the information image refers to an image containing predetermined information, and may be an image in which the contained information itself may be displayed as an image or encoded. FIG. 5 illustrates an example of the information image displayed on the display apparatus according to an embodiment of the disclosure. For example, the information image may be given in the form of at least one of a barcode 501, a quick response (QR) code 502, a color code 503, and a high capacity color barcode 504. However, there are no limits to the form of the information image, and the information image may include any image that contains predetermined information. Further, there are no specific limits to the content of the predetermined information contained in the information image.

According to the disclosure, the information image contains the operation state information of the display apparatus 100. The information image may externally show it itself or may not show whether the operation state information is contained in the information image.

The information image of the disclosure may be recognizable by the user terminal 200. For example, the information image of the disclosure may be captured by the image capturer provided in the user terminal 200 and then recognized by a predetermined application of the user terminal 200. Alternatively, the information image itself may be transmitted to the user terminal 200 and then recognized by the user terminal 200. However, there are no limits to the method of recognizing the information image trough the user terminal 200.

Figure 6:
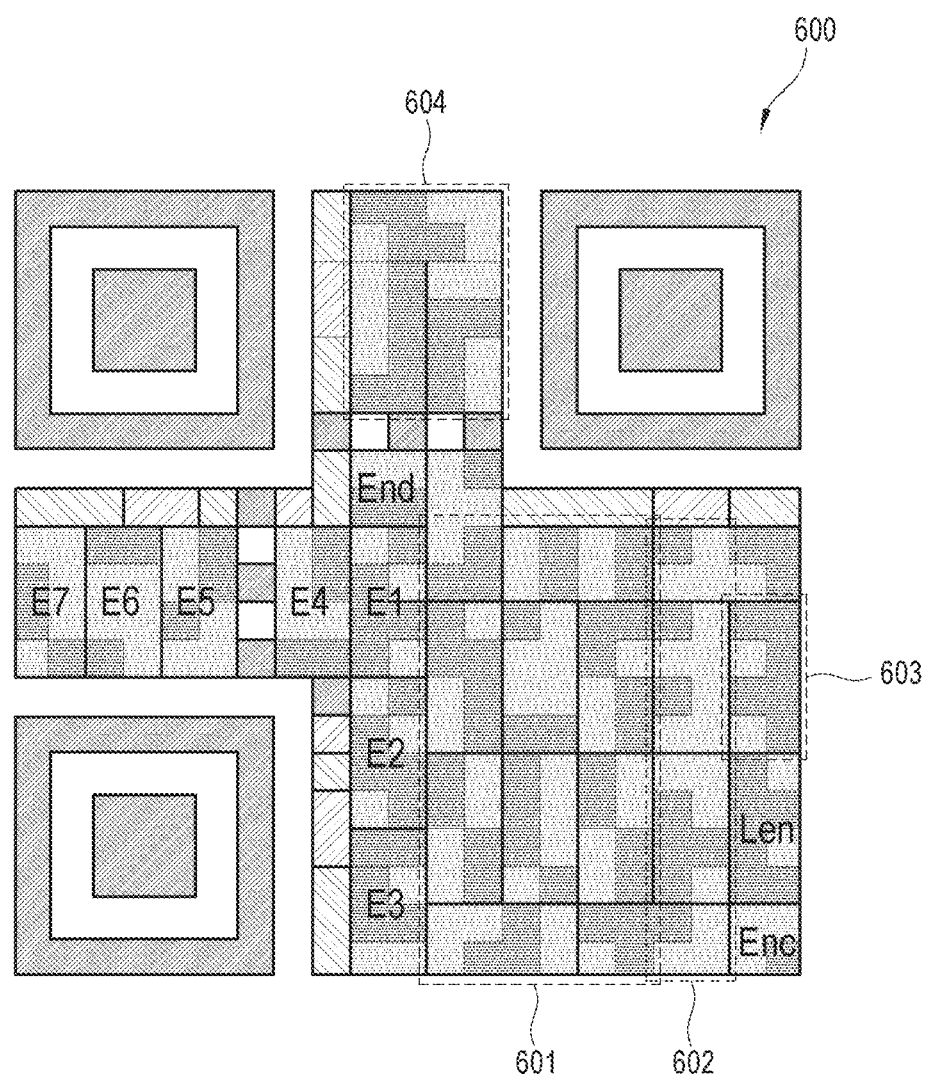
FIG. 6 is a view illustrating an example of information included in an information image according to an embodiment of the disclosure.

Referring to FIG. 6, an example of the information image of the disclosure will be described in detail on the assumption that the information image is given in the form of the QR code.

According to an embodiment of the disclosure, information image 600 may be divided into a section 601 including the operation state information and a section 602 including address information of a server to which the operation state information will be transmitted. The information in each section may be encoded according to a QR code encoding method of a predetermined version. Further, the information image 600 may additionally include identification information 603 indicating that the operation state information is contained in the corresponding information image, that the information will be transmitted to the server, etc. The identification information 603 may further include information about a start point and/or an end point of the server address information and the operation state information within the corresponding QR code. Further, the information image 600 may additionally include information 604 about a predetermined application for recognizing the corresponding information image or performing transmission to the server.

When the information image containing the foregoing information is displayed on the display 103 of the display apparatus 100, a user may obtain the displayed information image through the user terminal 200. For example, when the information image is given in the form of the QR code as shown in FIG. 6, a user captures the QR code displayed on the display apparatus 100 through the image capturer of the user terminal 200. However, there are no limits to a method of obtaining the information image by the user terminal 200. Further, a user of the user terminal 200 may include not only a general user who receives information displayed by the display apparatus 100, but also a manager who manages the display apparatus 100 or a manager who manages the server 300. In this case, the user terminal 200 may be a terminal specialized in the management of the managers.

The user terminal 200 may obtain the information image and transmit the obtained information image to the server 300. For example, a predetermined application in the user terminal 200 may analyze/process the obtained information image so that the information image itself or the operation state information included in the information image can be transmitted to the server 300.

Thus, the display apparatus of the disclosure may effectively transmit the information about the operation state of the display apparatus to the server through the user terminal even though direct communication with the server is impossible. Accordingly, it is possible to reduce efforts and costs needed for maintenance of the display apparatus.

Meanwhile, the processor 102 of the display apparatus 100 according to an embodiment of the disclosure may generate the operation state information based on a preset operation state of the display apparatus 100. For example, when the display apparatus 100 includes the sensing unit 105, the processor 102 identifies whether the display apparatus 100 is in the preset operation state based on various pieces of sensing information collected in the sensing unit 105, and generates the operation state information when the state of the display apparatus 100 corresponds to the preset operation state. Here, the preset operation state may for example include a situation that a certain element of the display apparatus 100 is identified as failure, a situation that is expected to fail (for example, the operation temperature of the display apparatus is out of predetermined range), etc., but not be limited thereto.

Thus, the operation state information is generated only when the display apparatus is in the preset operation state, and the information image containing the operation state information is displayed and transmitted to the server through the user terminal, thereby more efficiently transmitting the operation state information to the server.

However, the disclosure is not limited to this example, and the processor 102 of the display apparatus 100 according to an embodiment of the disclosure may generate the on a predetermined cycle and display the information image containing the operation state information so that the operation state information can be periodically transmitted to the server. Alternatively, when the information image includes marketing information, the processor 102 may generate the operation state information in sync with time to provide the marketing information to a user or display the information image containing the operation state information as it will be described below with reference to FIG. 12. However, this is merely an example, and there are no limits to time for generating the operation state information or time for outputting the information image.

Figure 7:
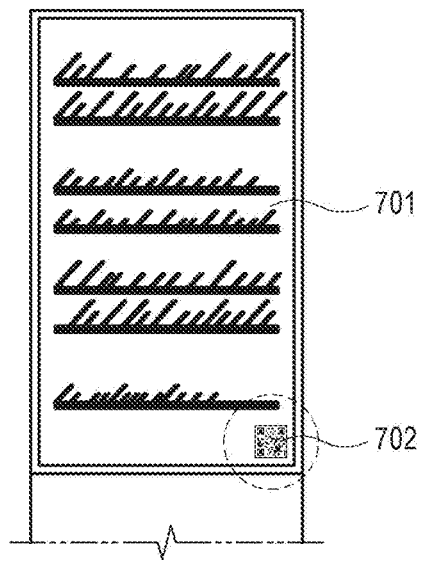
FIG. 7 is a view illustrating an example of a method of displaying an information image according to an embodiment of the disclosure.

FIG. 7 is a view illustrating an example of a method of displaying an information image according to an embodiment of the disclosure. The processor 102 of the display apparatus 100 according to an embodiment of the disclosure may display an information image 702 in addition to a content image 701, as shown in FIG. 7, when the content image 701 is displayed on the display 103. Alternatively, the processor 102 may stop displaying the displaying content image and display the information image. Alternatively, the processor 102 may display the information image on a banner or the like continuously displayed on the display 103, so that the information image can be continuously displayed on the display 103, or may display the information image to match well with the displaying content image by identifying a display position for the information image based on a design template of the content image.

Figure 8:
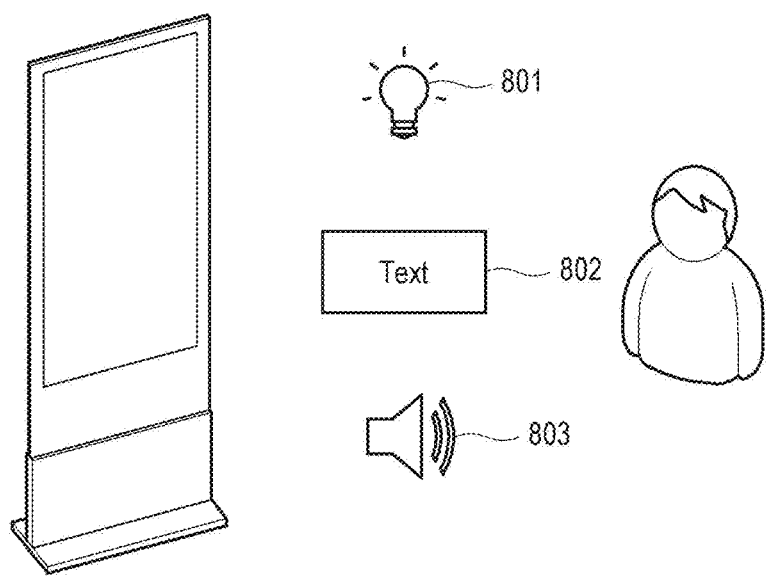
FIG. 8 is a view illustrating an example of notification information according to an embodiment of the disclosure.

FIG. 8 is a view illustrating an example of notification information according to an embodiment of the disclosure. The information image displayed on the display 103 of the display apparatus 100 according to an embodiment of the disclosure is transmitted to the server 300 through the user terminal 200 of a user, and therefore the processor 102 of the display apparatus 100 makes the information image be displayed on the display 103 and furthermore outputs notification information for notifying the user that the information image is displayed on the display 103, thereby calling and bring the user's attention to the information image. For example, ad shown in FIG. 8, the processor 102 may make an image 801 noticeable to a user or a text 802 be displayed on the display 103, or make a predetermined sound 803 be output from the display apparatus 100, thereby notifying that the information image is displayed on the display 103. However, there are no limits to the type and kind of notification information, and the notification information may include any type of information as long as it can notify a user that the information image is displayed, and may include combination of various types of information.

Thus, a user is actively informed that the information image is displayed, so that a percentage of the displayed information image transmitted to the server can be increased.

Figure 9:
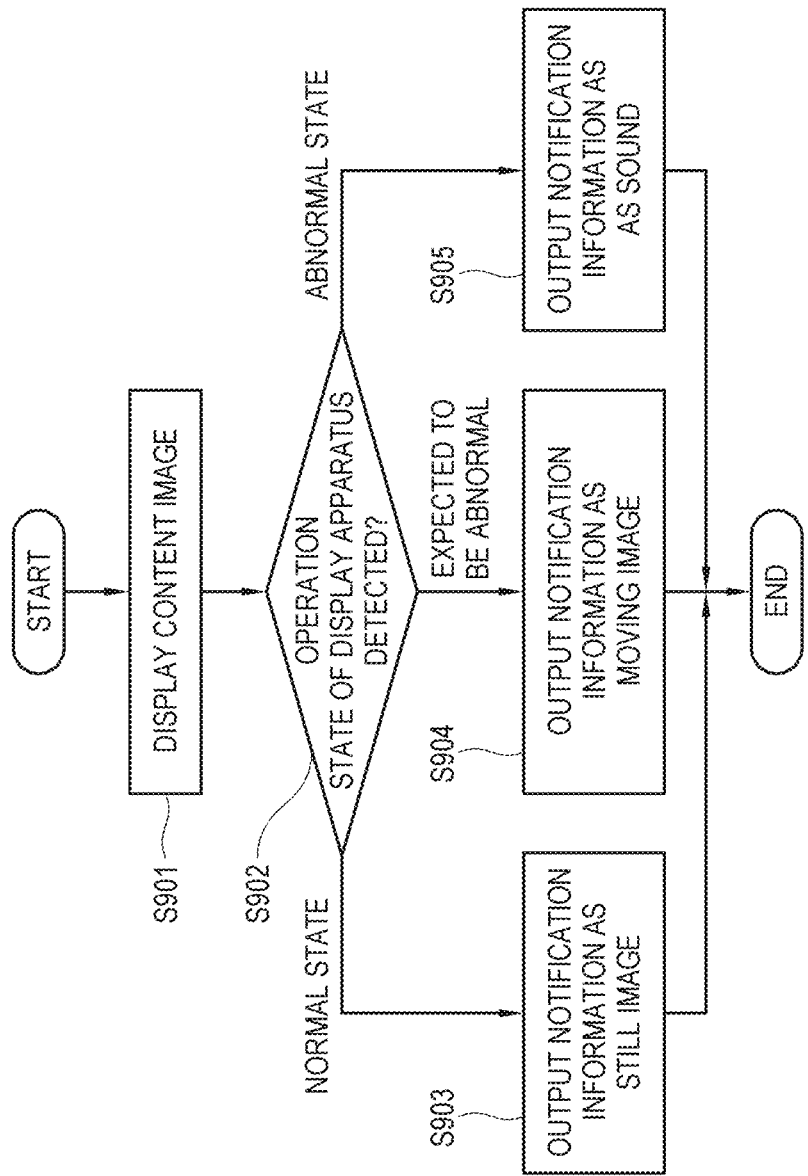
FIG. 9 is a view illustrating an example of a method of displaying notification information according to an embodiment of the disclosure.

FIG. 9 is a view illustrating an example of a method of displaying notification information according to an embodiment of the disclosure. As shown in FIG. 9, the processor 102 outputs different kinds of notification information according to the operation states of the display apparatus, thereby properly controlling a probability, a percentage, a waiting time, etc. of transmitting the operation state information to the server according to the situations of the display apparatus.

Specifically, the processor 102 displays a content image (S901), and then detects the operation state of the display apparatus (S902). When it is identified as a detection result that the display apparatus 100 is in a normal state, the processor 102 outputs the notification information in the form of a still image (S903). On the other hand, when it is identified as a detection result that the display apparatus 100 is expected to be abnormal, the processor 102 outputs the notification information in the form of a moving image (S904). On the other hand, when it is identified as a detection result that the display apparatus 100 is in an abnormal state, the processor 102 outputs the notification information in the form of a still sound (S905). In other words, the processor 102 outputs the notification information more noticeable to a user in a situation that a necessity for transmitting the operation state information of the display apparatus 100 to the server becomes higher, thereby increasing a probability or percentage of transmitting the operation state information contained in the information image to the server 300 through the user terminal 200, or decreasing a total time taken to transmit the operation state information to the server 300 including the waiting time. Here, the normal state, the state expected to be abnormal, or the abnormal state of the display apparatus may be identified based on the detection information of the sensing unit 105, and they may be previously set or may be based on information about each state received from the server or other external apparatuses.

Thus, the probability or percentage and the waiting time of transmitting the operation state information to the server may be controlled according to the situations of the display apparatus.

Figure 10:
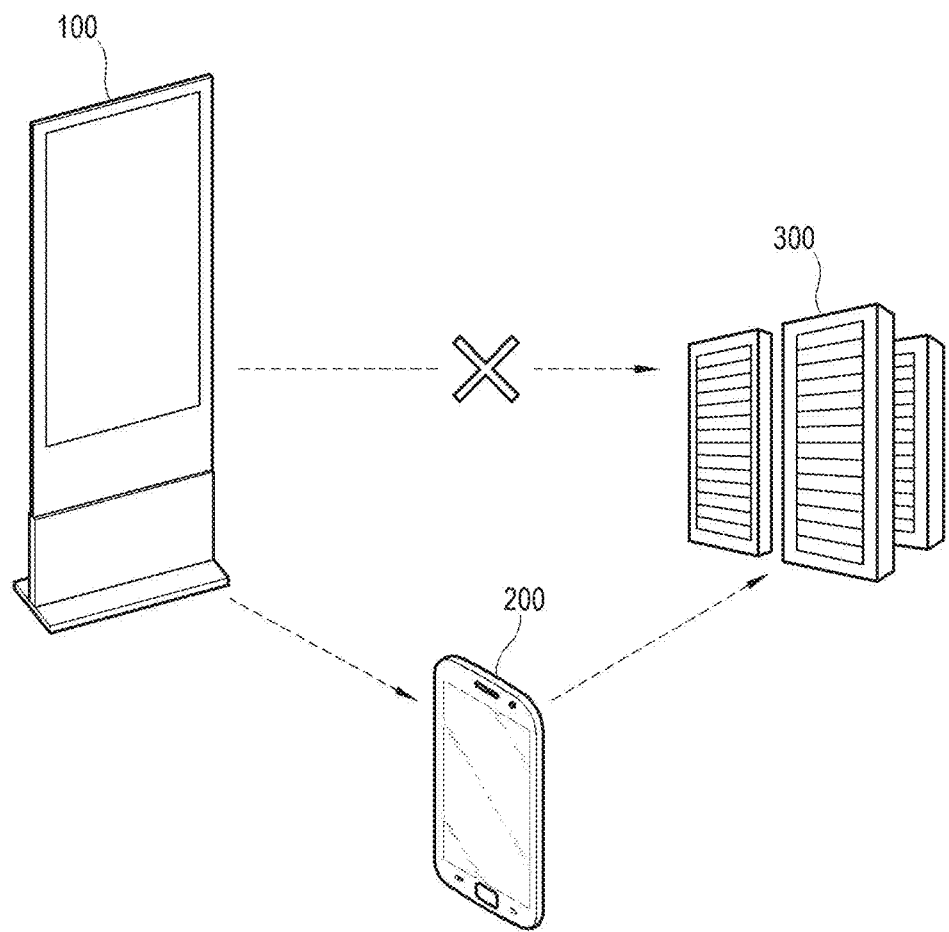
FIG. 10 is a schematic view of a system including a display apparatus according to another embodiment of the disclosure.

In the foregoing embodiments, the display apparatus 100 does not include a separate communicator for direct communication with the server 300. However, the display apparatus 100 of the disclosure is not limited to these embodiments. According to the disclosure, the display apparatus 100 may further include a second communicator for direct communication with the server 300, and the processor 102 may generate the operation state information based on failure in communication of the second communicator with the server 300. In other words, as shown in FIG. 10, the disclosure is applicable to a case that the direct communication is temporarily impossible due to communication failure between the second communicator and the server 300 even though the display apparatus 100 additionally includes the second communicator and fundamentally supports the direct communication with the server 300.

Figure 11:
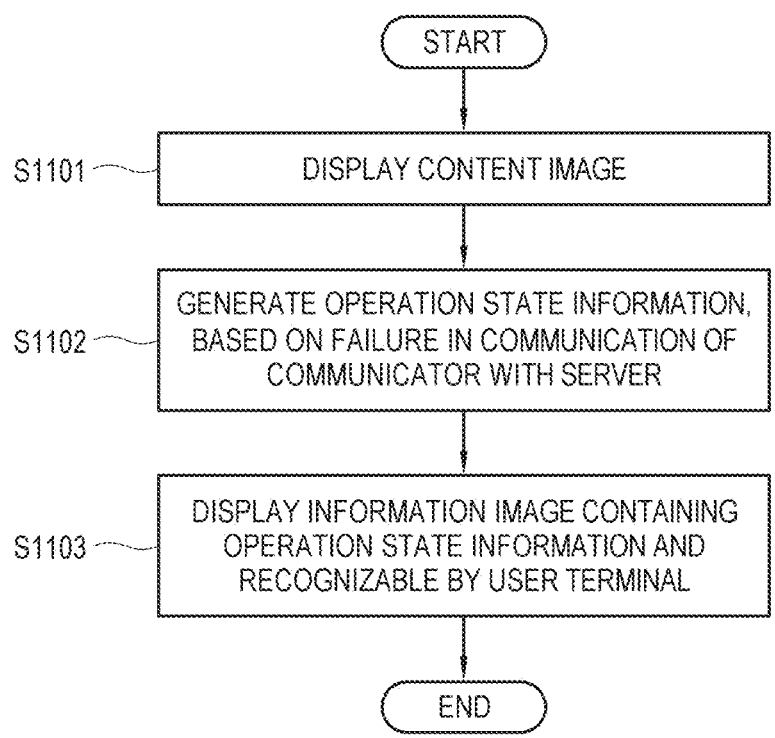
FIG. 11 is a flowchart showing operation of a display apparatus according to another embodiment of the disclosure.

In this regard, detailed descriptions will be made with reference to FIG. 11. FIG. 11 is a flowchart showing operation of a display apparatus according to another embodiment of the disclosure.

According to another embodiment of the disclosure, the processor 102 of the display apparatus 100 displays a content image (S1101).

The processor 102 generates the operation state information based on failure in communication of the second communicator with the server 300 (S1102). Here, the failure in the communication includes all situations that the communication with the server is not normally performed through the second communicator. The processor 102 may analyze information indicating the state of the communication using the second communicator and identify whether failure in communication occurs or is expected. For example, the processor 102 controls the second communicator to transmit a predetermined packet to the server 300, and then analyzes information (response) to the packet, thereby identifying whether or not the communication using the second communicator normally operates. However, there are no limits to a method of identifying the failure in the communication.

When it is identified by the analysis that the second communicator fails in the communication with the server 300 or that the communication is not impossible but expected to fail in communication due to warning or the like, the processor 102 generates the operation state information.

Then, the processor 102 displays the information image containing the operation state information and recognizable by the user terminal 200 (S1103), thereby making the operation state information contained in the information image be transmitted to the server 300 by the user terminal 200.

Although the display apparatus with the communicator capable of performing direct communication with the server fails in communication and thus the direct communication with the server is temporarily impossible, information about the operation state of the display apparatus may be transmitted to the server.

Figure 12:
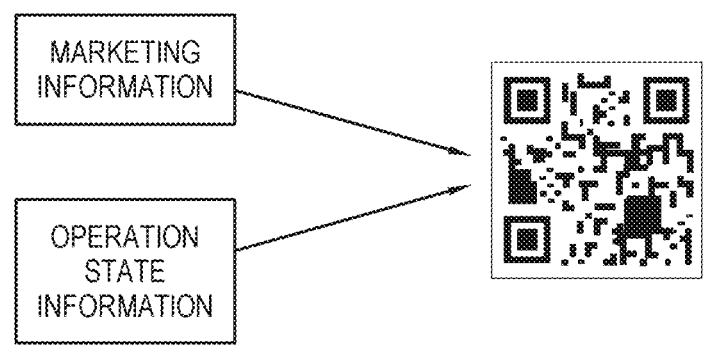
FIG. 12 is a view illustrating an example of an information image according to still another embodiment of the disclosure.

FIG. 12 is a view illustrating an example of an information image according to still another embodiment of the disclosure. In other words, as shown in FIG. 12, the information image according to this embodiment of the disclosure may further include marketing information provided to a user of the user terminal 200 in addition to the operation state information. Here, the marketing information refers to information about predetermined goods or service, and includes all sorts of information to be delivered to a user or a consumer. In particular, the marketing information may contain event information that offers benefits to a user. When the marketing information contains the event information, it is possible to further arouse a user's interest and attention.

When the information about predetermined goods or service is displayed on the display 103 of the display apparatus 100, the marketing information may be related to the goods or service. However, the marketing information may contain information about goods or service unrelated to the goods or service displayed on the display apparatus 100, without limitations.

When the information image contains the marketing information, the processor 102 may further output information indicating that the marketing information is contained in the corresponding information image. For example, when the information containing the marketing information along with the operation state information is given in the form of the QR code as shown in FIG. 12, only the QR code is not enough to let a user know whether the information contains the marketing information, and therefore the processor 102 makes the display 103 display a message of "A giveaway event is in progress. Please read the QR code below and check the event information", or the like, thereby notifying a user that the information image contains the marketing information useful for a user. However, there are no limits to the content and the output method of the information indicating that the information image contains the marketing information.

By arousing a user's interest in and attention to the information image displayed on the display apparatus, and inducing a user's behavior of recognizing the information image through the user terminal, it is possible to increase probability of transmitting the operation state information contained the information image to the server through the user terminal.

Figure 13:
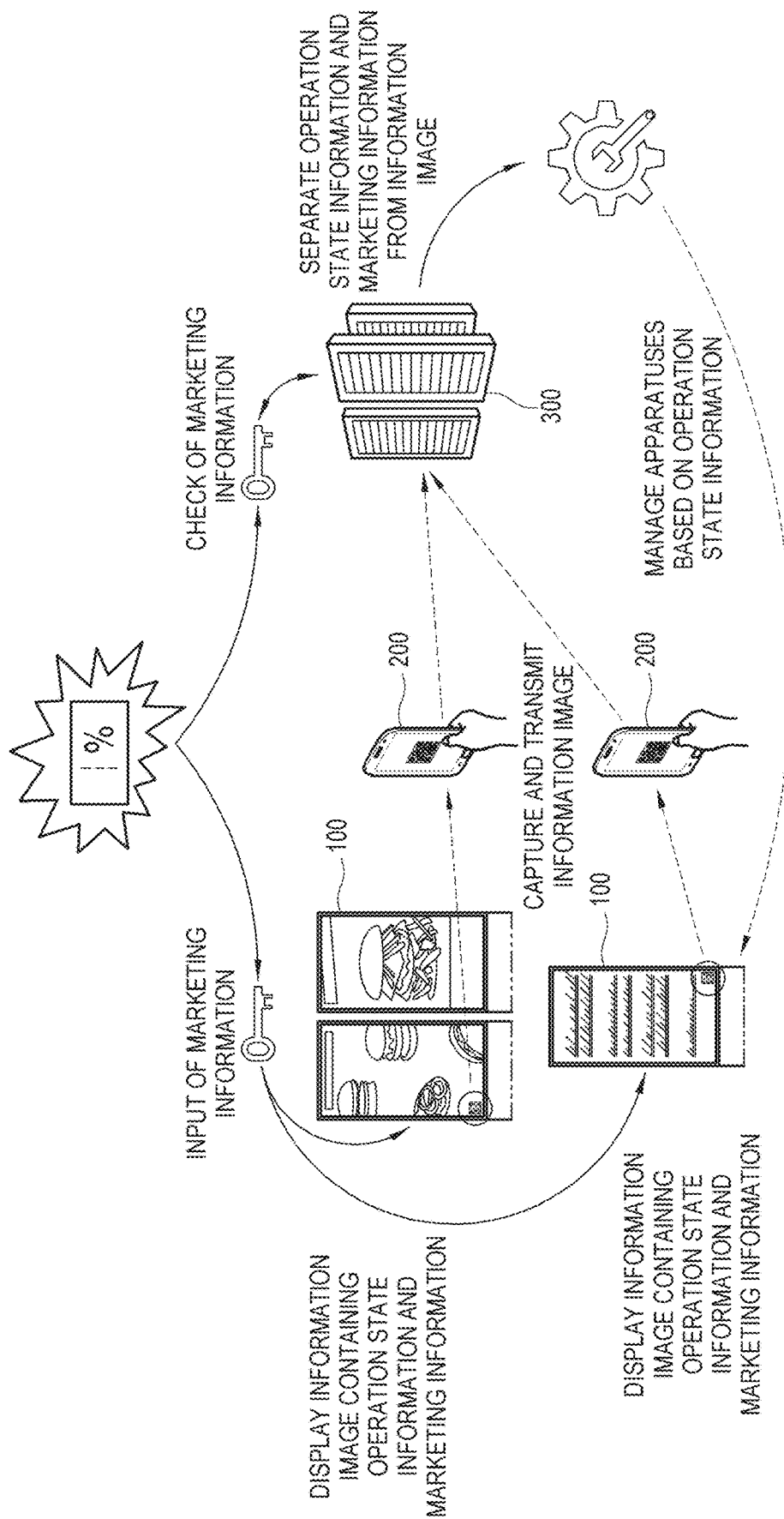
FIG. 13 is a schematic view of a system including a display apparatus according to still another embodiment of the disclosure.

According to still another embodiment of the disclosure, i.e. according to an embodiment where the information image further includes the marketing information, operation of a display apparatus and a system including the same will be described with reference to FIGS. 13 and 14. FIG. 13 is a schematic view of a system including a display apparatus according to still another embodiment of the disclosure, and FIG. 14 is a flowchart showing operation of a system including a display apparatus according to still another embodiment of the disclosure.

Figure 14:
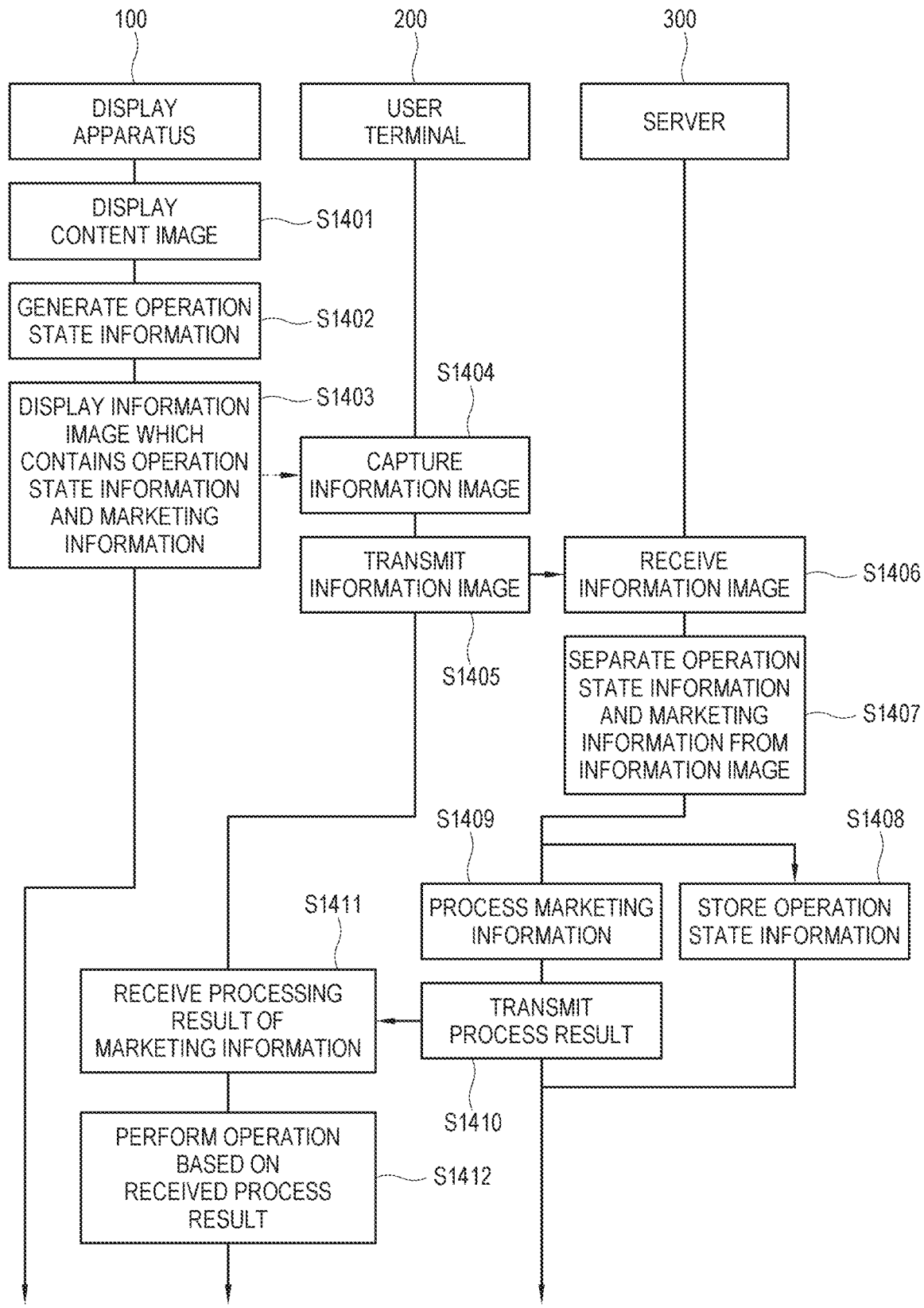
FIG. 14 is a flowchart showing operation of a system including a display apparatus according to still another embodiment of the disclosure.

Referring to FIG. 14, operation of each apparatus and transfer of information in this embodiment will be described below in detail. First, the processor 102 of the display apparatus 100 makes a content image be displayed on the display 103 (S1401). Then, the processor 102 of the display apparatus 100 generates the operation state information to be transmitted to the server 300 (S1402), and makes the information image containing the marketing information in addition to the generated operation state information be displayed on the display 103 (S1403). The processor 102 may further output information indicating that the information image contains the marketing information.

When a user who knows that the information image containing the marketing information is displayed inputs a user command issued to capture the displayed information image to the user terminal 200, the processor 202 of the user terminal 200 receives the user command and controls the user terminal to capture the information image displayed on the display 103 of the display apparatus 100 (S1404). Then, the processor 202 recognizes the information image obtained by the capturing, and then controls the user terminal to transmit the information image to the server 300 (S1405). For example, when the information image contains the information shown in FIG. 6, the processor 202 of the user terminal 200 may directly perform a process of transmitting the information image to the server 300 with reference to the identification information 603, or make the transmission process be performed through a predetermined application of the user terminal 200.

As the user terminal 200 transmits the information image, the processor 302 of the server 300 controls the server 300 to receive the information image (S1406). Further, the processor 302 of the server 300 separates the operation state information and the marketing information from the received information image (S1407), and performs an individual process with regard to each piece of the information. For example, the operation state information is subjected to a process for storing the operation state (S1408), thereby collecting basic data for the maintenance of the display apparatus 100. On the other hand, the marketing information is processed (S1409), and then a process result is transmitted to the user terminal 200 (S1410). For example, when the marketing information contains event information for promoting a predetermined product, the processor 302 of the server 300 identifies whether a user of the user terminal 200 wins an event based on the separated marketing information, and transmits an identification result to the user terminal 200.

As the server 300 transmits the result of processing the marketing information, the processor 202 of the user terminal 200 controls the user terminal 200 to receive the result of processing the marketing information (S1411). Further, the processor 202 executes operation based on the received process result (S1412). For example, the processor 202 receives the result of whether a user wins the event or not from the server 300, and controls the user terminal 200 to output an image based on the wining result.

Meanwhile, the user terminal 200 in the foregoing description, by way of example, captures the information image displayed on the display apparatus 100 in order to obtain the information image, but the embodiment of the disclosure is not limited to this description. Alternatively, the processor 102 of the display apparatus 100 may transmit the information image to the user terminal 200 instead of or along with displaying the information image on the display 103. In particular, the display apparatus 100 may transmit the information image to the user terminal 200 by short-range communication. In this regard, descriptions will be made with reference to FIG. 15.

Figure 15:
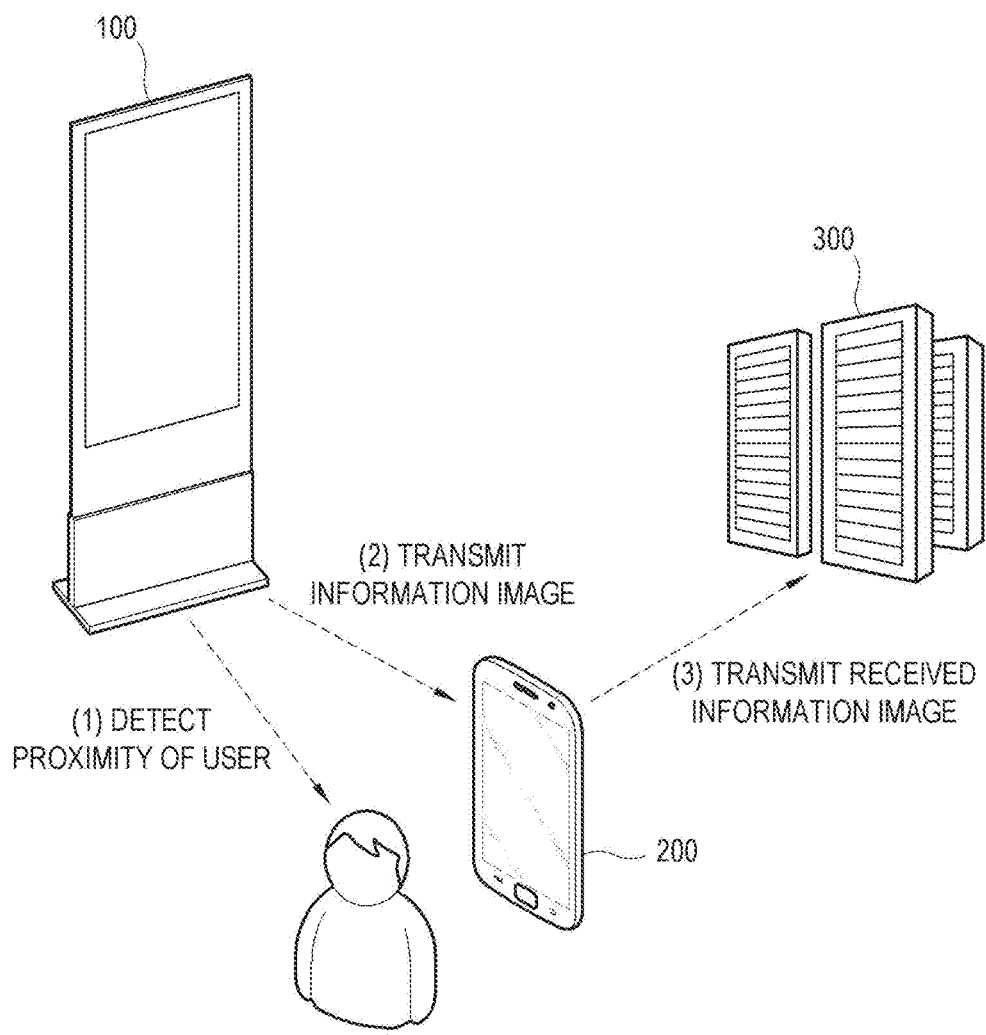
FIG. 15 is a schematic view showing operation of a system including a display apparatus according to still another embodiment of the disclosure.

FIG. 15 is a schematic view showing operation of detecting a user's approach to the display apparatus 100 and transmitting the information image to the user terminal 200 when the display apparatus 100 uses a short-range communication technique to communicate with the user terminal 200. In other words, the processor 102 of the display apparatus 100 generates the information image containing the operation state information, detects whether a user approaches the display apparatus 100 (see (1) of FIG. 15), and transmits the information image to the user terminal 200 when the user's approach is detected (see (2) of FIG. 15). Alternatively, the display 103 may display the information image and allow a user to capture the information image like the foregoing embodiment, after detecting whether the user approaches the display apparatus 100.

The processor 202 of the user terminal 200 receives the information image and then transmits the received information image to the server 300 (see (3) of FIG. 15). To this end, the short-range communication technique includes a beacon technique, etc. by way of example without limitations. As an example of a communication module for the short-range communication, there are Bluetooth, BLE, NFC, etc. but there are no limits to the kind of communication module. Alternatively, instead of using the processor 102 of the display apparatus 100 to detect a user's location as described above, the user may employ the user terminal 200 to make a direct request for the information image to the display apparatus 100.

Thus, a user's capturing operation is omitted in this embodiment on the contrary to the case where a user directly control the user terminal to capture the information image so that the operation state information contained in the information image can be transmitted to the server, and it is thus more convenient for the user to transmit the operation state information to the server.

Figure 16:
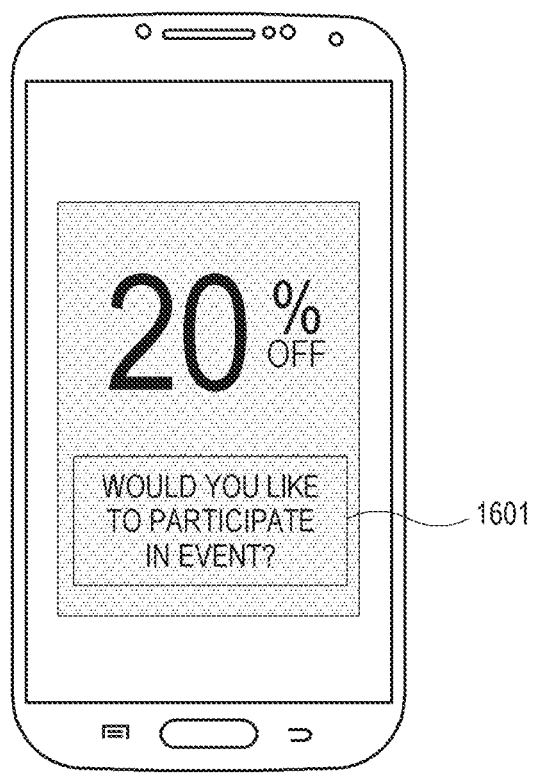
FIG. 16 illustrates an example of marketing information transmitted from a display apparatus to a user terminal according to still another embodiment of the disclosure.

Even in this embodiment, the information image may further include the marketing information. In other words, the processor 102 of the display apparatus 100 may generate the information image containing the marketing information in addition to the operation state information and then transmit the information image to the user terminal 200, thereby making the information image be displayed on the display 203 of the user terminal 200. In this case, the processor 102 of the display apparatus 100 may generate the information image so that only content about the marketing information can be externally displayed as shown in FIG. 16. Accordingly, a user may not recognize that the operation state information is contained in the information image.

Further, the processor 102 of the display apparatus 100 may further add an item 1601 to be selected by a user, while generating the information image to be directly transmitted to the user terminal 200 as the information image containing the marketing information in addition to the operation state information. For example, when the marketing information contains event information, the processor 102 may generate the information image to contain the item 1601 so that a user can select whether to participate in a corresponding event. In this case, the processor 202 of the user terminal 200 controls the user terminal 200 to transmit the information image to the server 300 for the purpose of processing the marketing information, in response to reception of a user's input of selecting the item 1601. Thus, the operation state information contained in the information image is also transmitted to the server 300.

Thus, it is possible to not only directly transmit the information image to the user terminal without a user's job of capturing the information image, but also control the information image and the operation state information contained in the information image to be transmitted to the server in response to a user's selection of checking the marketing information.

Figure 17:
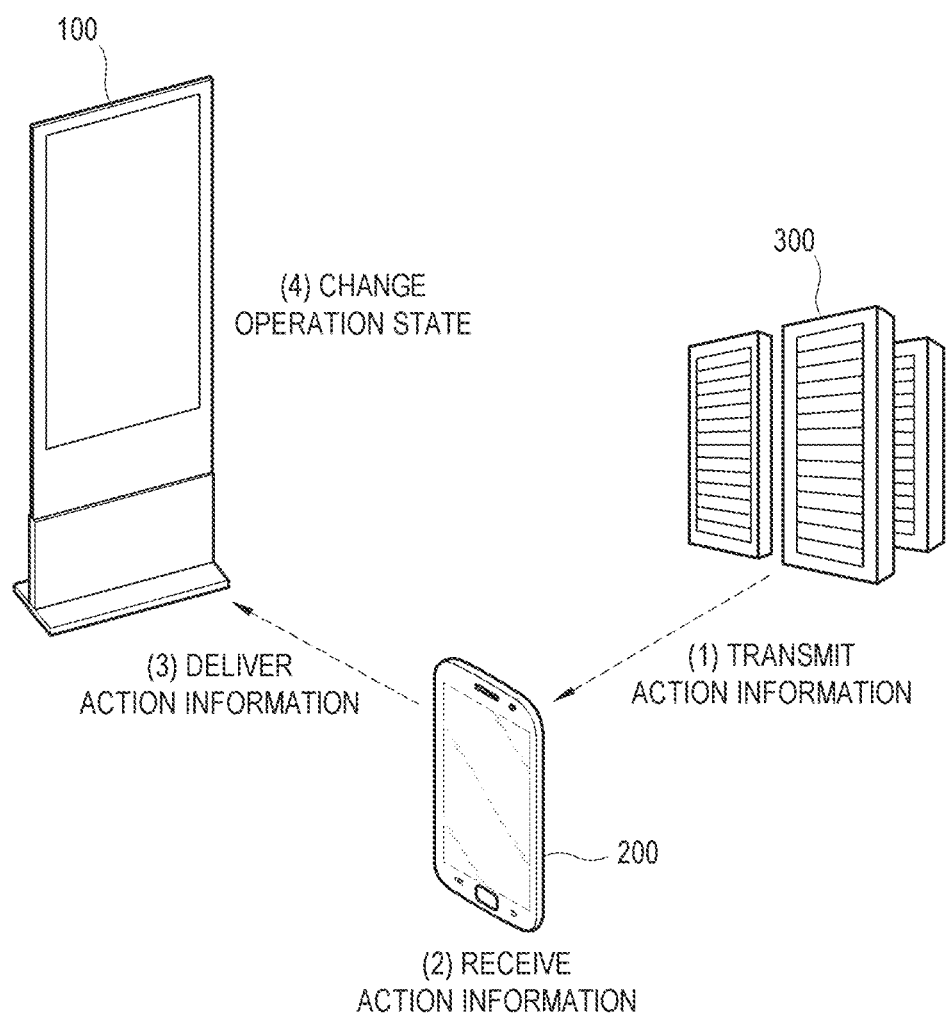
FIG. 17 is a schematic view showing operation of a system including a display apparatus according to still another embodiment of the disclosure.

Meanwhile, in the foregoing embodiment, the operation state information of the display apparatus 100 is transmitted to the server 300 through the user terminal 200 as embedded in the information image. Besides, the disclosure may further make the server 300 receiving the operation state information generate and transmit action information based on the received operation state information to the display apparatus 100 through the user terminal 200. Here, the action information refers to information generated corresponding to the operation state information of the display apparatus and utilized in changing the operation state of the display apparatus 100. In this regard, descriptions will be made with reference to FIG. 17.

For example, when the operation state information of the display apparatus 100 is transmitted to the server 300 based on one embodiment among the foregoing embodiments, the processor 302 of the server 300 not only stores—collects the operation state information in the storage so that a manager or the like can utilize the collected information for maintenance of the display apparatus 100, but also generates the action information to be utilized in changing the operation state of the display apparatus 100 and transmits the action information to the display apparatus 100 through the user terminal 200. In other words, when the processor 302 of the server 300 generates action information and transmits the action information to the user terminal 200 (see (1) of FIG. 17), the processor 202 of the user terminal 200 receives the action information (see (2) of FIG. 17) and then transmits the received action information to the display apparatus 100 (see (3) of FIG. 17). The display apparatus 100 receiving the action information from the user terminal 200 utilizes the action information to change the operation state of the display apparatus 100 (see (4) of FIG. 17). In this case, the user terminal 200 and the display apparatus 100 may be provided with separate applications to receive, transmit and process the action information as described above.

Thus, even when direct communication is impossible between the display apparatus and the server, it is possible to not only transmit the operation state information of the display apparatus to the server but also transmit the information generated in the server to the display apparatus as the information utilizable in the following action based on the operation state information, thereby further reducing efforts and costs required for the maintenance of the display apparatus.

As described above, according to the disclosure, it is possible to generate the state information of the display apparatus.

Further, according to the disclosure, the state information of the display apparatus is effectively transmitted to the server that manages the display apparatus.

Although a few exemplary embodiments have been described above with reference to the accompanying drawings, it will be appreciated by a person having an ordinary skill in the art that the embodiments may be actualized in different forms without changing their technical concept or essential features. Therefore, the foregoing embodiments are all for illustrative purposes only and should not be construed as limiting the disclosure.

What is claimed is:

1. A display apparatus comprising:
a display; and
a processor configured to
generate operation state information, which is information about an operation state of the display apparatus,
generate an encoded code that contains the generated operation state information, application information, and address information of a server, and
display the generated encoded code on the display so that the generated encoded code is captureable by a camera of a user terminal, and so that, after being captured by the camera of the user terminal, the generated encoded code is transmittable through an application of the user terminal executed according to the application information included in the generated encoded code from the user terminal to the server based on the address information of the server included in the generated encoded code, and the generated operation state information is obtainable by the server from the transmitted encoded code.

2. The display apparatus according to claim 1, wherein the processor is configured to generate the operation state information when the display apparatus is in a preset operation state.

3. The display apparatus according to claim 1, wherein the processor is configured to display a content image on the display, and to display the generated encoded code on the display concurrently with content image.

4. The display apparatus according to claim 1, wherein the processor is configured to
display a content image on the display, and,
when the generated encoded code is to be displayed on the display while the content image is being displayed, stop displaying the content image on the display and then display the generated encoded code on the display.

5. The display apparatus according to claim 1, wherein the processor is configured to:
when the generated encoded code is displayed on the display, output notification information to notify a user of the user terminal that the generated encoded code is displayed.

6. The display apparatus according to claim 1, wherein the processor is configured to output different kinds of notification information according to different operation states, respectively, of the display apparatus, to notify a user of the user terminal that the generated encoded code is displayed on the display.

7. The display apparatus according to claim 1, wherein
the display apparatus further comprises a communicator configured to communicate with the server, and
the processor is configured to generate the operation state information in response to a failure in communication of the communicator with the server.

8. The display apparatus according to claim 1, wherein the generated encoded code comprises marketing information to be provided to a user of the user terminal.

9. The display apparatus according to claim 1, wherein the processor is configured to wirelessly transmit the generated encoded code to the user terminal, based on proximity detection of a user of the user terminal approaching the display apparatus.

10. The display apparatus according to claim 1, further comprising:
a sensor configured to sense information regarding operation of the display apparatus and/or an environment of the display apparatus,
wherein the processor is configured to generate the operation state information based on the sensed information.

11. The display apparatus according to claim 1, wherein the generated encoded code is a barcode, a quick response (QR) code, a color code or a high capacity color barcode.

12. A method comprising:
by a display apparatus,
generating operation state information, which is information about an operation state of the display apparatus,
generating an encoded code that contains the generated operation state information, application information, and address information of a server, and
displaying the generated encoded code on a display of the display apparatus so that the generated encoded code is captureable by a camera of a user terminal, and so that, after being captured by the camera of the user terminal, the generated encoded code is transmittable through an application of the user terminal executed according to the application information included in the generated encoded code from the user terminal to the server based on the address information of the server included in the generated encoded code, and the generated operation state information is obtainable by the server from the transmitted encoded codecs.

13. The method according to claim 12, wherein the generating of the operation state information comprises generating the operation state information when the display apparatus is in a preset operation state.

14. The method according to claim 12, further comprising:
by the display apparatus,
displaying a content image on the display,
wherein the displaying the generated encoded code comprises:
displaying the generated encoded code on the display concurrently with the content image.

15. The method according to claim 12, further comprising:
displaying a content image on the display,
wherein the displaying the generated encoded code comprises:
when the generated encoded code is to be displayed on the display while the content image is being displayed, stop displaying the content image on the display and then displaying the generated encoded code on the display.

16. The method according to claim 12, further comprising:
by the display apparatus,
outputting notification information to notify a user of the user terminal that the generated encoded code is being displayed on the display.

17. The method according to claim 12, wherein
the display apparatus includes a communicator configured to communicate with the server, and
the generating of the operation state information comprises generating the operation state information in response to a failure in communication of the communicator with the server.

18. The method according to claim 12, wherein the generated encoded code comprises marketing information to be provided to a user of the user terminal.

\* \* \* \* \*

UNITED STATES PATENT AND TRADEMARK OFFICE
CERTIFICATE OF CORRECTION

PATENT NO. : 11,170,277 B2  
APPLICATION NO. : 16/509013  
DATED : November 9, 2021  
INVENTOR(S) : Doyoung Kim et al.

Page 1 of 1

It is certified that error appears in the above-identified patent and that said Letters Patent is hereby corrected as shown below:

In the Claims

Column 15, Line 16:
In Claim 1, delete "captureable" and insert --capturable--, therefor.

Column 16, Line 22:
In Claim 12, delete "captureable" and insert --capturable--, therefor.

Column 16, Line 32:
In Claim 12, delete "codecs." and insert --code.--, therefor.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*